United States Patent
Saras

(10) Patent No.: US 7,627,649 B2
(45) Date of Patent: Dec. 1, 2009

(54) INFORMATION SUBMISSION TOOL FOR WEBSITE DEVELOPMENT

(75) Inventor: Shell James Saras, Smyrna, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 659 days.

(21) Appl. No.: 11/223,605

(22) Filed: Sep. 9, 2005

(65) Prior Publication Data

US 2007/0061408 A1  Mar. 15, 2007

(51) Int. Cl.
- G06F 3/00 (2006.01)
- G06F 3/048 (2006.01)
- G06F 15/16 (2006.01)

(52) U.S. Cl. .................. 709/218; 709/201; 709/204; 709/217; 715/744; 715/751; 715/760; 715/762

(58) Field of Classification Search .............. 709/218, 709/201–207, 217–219; 715/744–74, 751–752, 715/760, 762–763, 962–963; 707/104.1
See application file for complete search history.

(56) References Cited

U.S. PATENT DOCUMENTS

| | | | |
|---|---|---|---|
| 5,704,029 A * | 12/1997 | Wright, Jr. ................ 715/223 |
| 6,185,587 B1 * | 2/2001 | Bernardo et al. ........... 715/760 |
| 6,189,029 B1 * | 2/2001 | Fuerst ...................... 709/217 |
| 6,275,848 B1 * | 8/2001 | Arnold ..................... 709/206 |
| 6,308,188 B1 | 10/2001 | Bernardo |
| 6,327,046 B1 * | 12/2001 | Miyamoto et al. .......... 709/206 |
| 6,463,463 B1 * | 10/2002 | Godfrey et al. ............ 709/206 |
| 6,505,212 B2 | 1/2003 | Nakano |
| 6,640,230 B1 * | 10/2003 | Alexander et al. ........... 707/10 |
| 6,684,369 B1 * | 1/2004 | Bernardo et al. ............ 715/760 |
| 6,697,825 B1 | 2/2004 | Underwood |
| 6,745,238 B1 | 6/2004 | Giljum et al. |
| 6,792,454 B2 | 9/2004 | Nakano |
| 6,859,784 B1 * | 2/2005 | van Duyne et al. ........... 705/10 |
| 7,254,553 B2 * | 8/2007 | Fogelson .................... 705/27 |
| 7,430,535 B2 * | 9/2008 | Dougherty et al. .......... 709/224 |
| 2002/0129106 A1 * | 9/2002 | Gutfreund ................... 709/205 |
| 2002/0184255 A1 | 12/2002 | Edd |
| 2002/0198890 A1 * | 12/2002 | Jackson ..................... 707/101 |
| 2003/0028419 A1 | 2/2003 | Monaghan |
| 2003/0041261 A1 * | 2/2003 | Shukan ...................... 713/200 |
| 2003/0088479 A1 * | 5/2003 | Wooten et al. ............... 705/26 |
| 2003/0171973 A1 * | 9/2003 | Wilce et al. .................. 705/9 |
| 2003/0217117 A1 | 11/2003 | Dan |
| 2003/0221162 A1 | 11/2003 | Sridhar |
| 2004/0205533 A1 * | 10/2004 | Lopata et al. ............... 715/507 |
| 2004/0205659 A1 * | 10/2004 | Barry et al. ................. 715/530 |
| 2004/0261017 A1 | 12/2004 | Perry |
| 2007/0208751 A1 * | 9/2007 | Cowan et al. ................ 707/10 |
| 2007/0250769 A1 * | 10/2007 | Bass et al. .................. 715/523 |

* cited by examiner

*Primary Examiner*—Joseph E Avellino
*Assistant Examiner*—Jenee Williams
(74) *Attorney, Agent, or Firm*—Scott P. Zimmerman PLLC

(57) ABSTRACT

Methods, systems, and products are disclosed for developing a website. One such method transmits a questionnaire to a website client. The questionnaire includes questions for developing the website. A response to the questionnaire is received and examined for unanswered questions. For at least one unanswered question a calendar entry for a calendaring application is created. The calendar entry corresponds to an event and a rule, with the event describing the unanswered question and the rule comprising a reminder of the event. The calendar entry is transmitted to the calendaring application to remind the website client of the unanswered question.

15 Claims, 13 Drawing Sheets

INFORMATION SUBMISSION TOOL FOR WEBSITE DEVELOPMENT

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to presentation processing, electrical computers, and to data processing and, more particularly, to remote data accessing and to file or database maintenance.

Gathering information to develop a website is challenging. Many website clients contract with a website designer to develop a website. The website client is any person, business, advertiser, or other entity that desires to have an online presence. The website designer gathers information for the website and begins developing the website. One problem, however, is timely gathering the information needed to develop the website. Often times the website designer only has a short period of time to develop the website before billing is initiated. That is, a billing department for the website designer wants the website quickly developed and posted so that the website client can be billed for the online presence. Sometimes the billing department requires the website to be posted within ten days or less.

The website designer, however, often experiences a bottleneck. Before the website designer can create the website, the designer must receive all required information. The website designer, for example, must obtain contact information for the client (such as an address, phone number, email address, and contact name), business type, business name, business logo, business trademarks, layout, colors, and other information. Because the website client is urged to provide this information within a short time period, the website designer often utilizes urgent shipping services (e.g., Federal Express services) to obtain the information. The website designer then rushes development to meet the billing timeline. The website designer is thus forced to compromise development efforts, and the urgent shipping services incur added expenses. What is needed, then, is a more efficient and less costly website development tool that helps website clients timely provide information.

SUMMARY

The aforementioned problems, and other problems, are reduced, according to the exemplary embodiments, using methods, systems, and products that provide an online submission tool for website development. This online submission tool creates a list of questions for the website client to answer. The website client visits a website and downloads the questionnaire using an Internet browser. The questionnaire asks questions that help obtain information for the website. The questionnaire may include data fields that also help obtain information. The website client answers the questions and submits a response. If the website client has digital logos, trademarks, or other artwork for the website, the online submission tool may also allow the client to attach the artwork to the response. The website client's browser communicates the response to a server, and the response is then stored for retrieval. A website consultant or website designer may then access the response, obtain the website client's answers to the questions, and begin developing the website.

The online submission tool is efficient and less costly. The website client simply logs in with the online submission tool, answers the questions presented by the questionnaire, and submits their response. The response is nearly immediately received by the website developer, and the website developer can immediately begin development of the client's website. No time is wasted using ordinary mail services, and no costs are incurred for urgent shipping services. Moreover, should the website client leave some questions unanswered, the online submission tool may automatically set reminders to the client. That is, if questions remain unanswered, the exemplary embodiments create calendar entries for the website client's calendaring application.

The exemplary embodiments create a task reminder, such that the website client's calendaring application automatically reminds the client of the unanswered question. The website client is thus automatically reminded that information remains to be submitted before the website can be completely developed.

The exemplary embodiments include methods, systems, and products for developing a website. One such method transmits a questionnaire to a website client. The questionnaire includes questions for developing the website. A response to the questionnaire is received and examined for unanswered questions. For at least one unanswered question a calendar entry for a calendaring application is created. The calendar entry corresponds to an event and a rule, with the event describing the unanswered question and the rule comprising a reminder of the event. The calendar entry is transmitted to the calendaring application to remind the website client of the unanswered question.

In another of the embodiments, a system produces an online submission form for developing a website. A processor obtains a questionnaire comprising questions for developing a website. An interface transmits the questionnaire to a website client and receives a response to the questionnaire. The processor examines the response for unanswered questions and, for at least one unanswered question, the processor creates a calendar entry for a calendaring application. The calendar entry corresponds to an event and a rule, with the event describing the unanswered question and the rule comprising a reminder of the event. The interface transmits the calendar entry to the calendaring application to produce a reminder to the website client of the unanswered question.

In yet another embodiment, a computer program product automatically creates calendar entries for development of a website. The computer program product comprises a computer-readable medium, and a website development application stores on the computer-readable medium. The website development application comprises computer code for transmitting a questionnaire to a website client. The questionnaire includes questions for developing the website. A response to the questionnaire is received and examined for unanswered questions. For at least one unanswered question a calendar entry for a calendaring application is created. The calendar entry corresponds to an event and a rule, with the event describing the unanswered question and the rule comprising a reminder of the event. The calendar entry is transmitted to the calendaring application to remind the website client of the unanswered question.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a website development application. This website development application provides an online submission tool for website development. This online submission tool creates a list of questions for the website client to answer. The website client visits a website and downloads the questionnaire using an Internet browser. The questionnaire asks questions that help obtain information for the website. The questionnaire may include data fields that also help obtain information. The website client answers the questions and submits a response. If the website client has digital logos, trademarks, or other artwork for the website, the online submission tool may also allow the client to attach the artwork to the response. The website client's browser communicates the response to a server, and the response is then stored for retrieval. A website consultant or website designer may then access the response, obtain the website client's answers to the questions, and begin developing the website.

Figure 1:
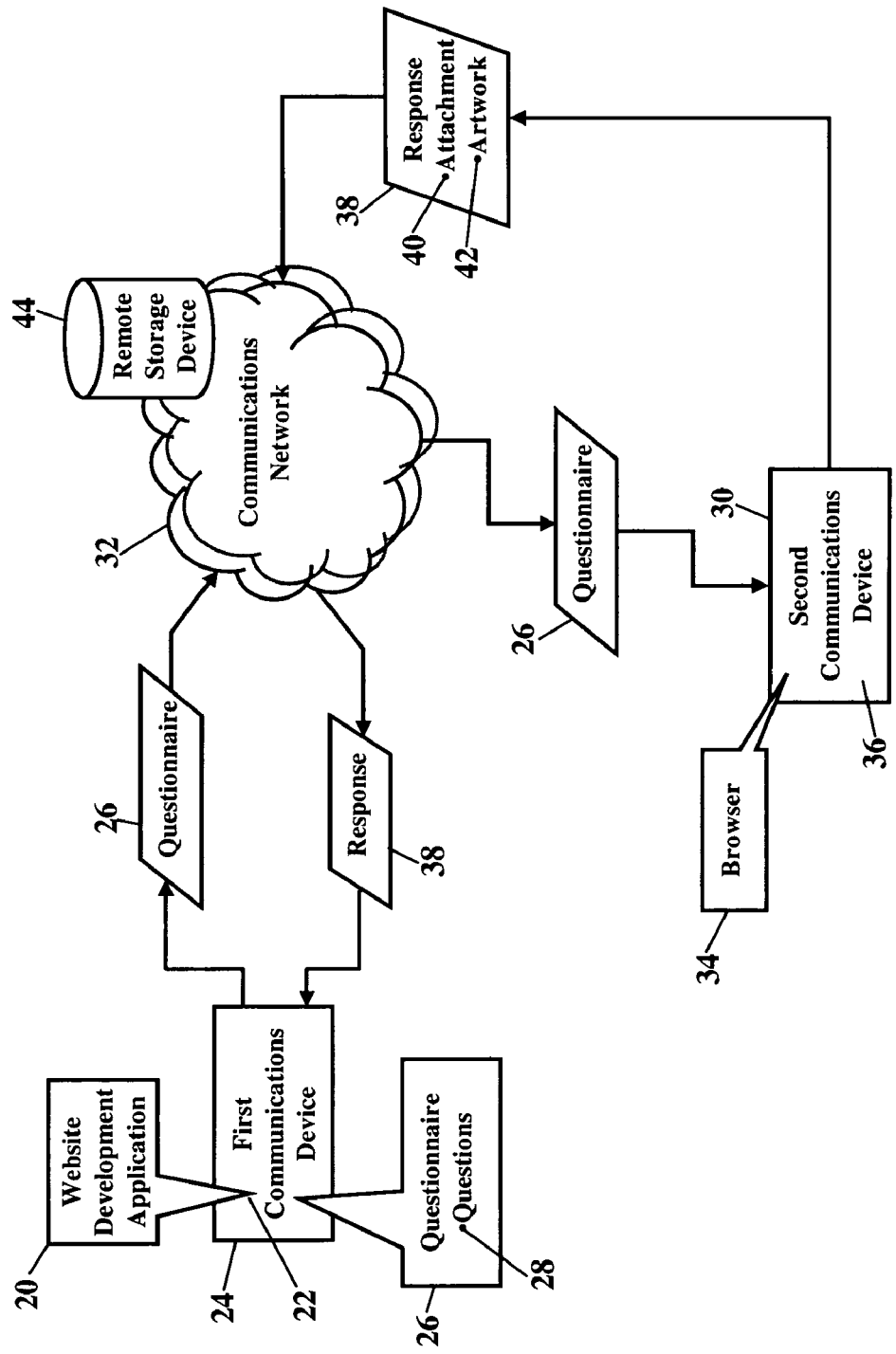
FIG. 1 is a schematic illustrating an exemplary implementation of a website development application, according to an exemplary embodiment.

FIG. 1 is a schematic illustrating implementation of a website development application 20, according to an exemplary embodiment. The website development application 20 stores in memory 22 of a first communications device 24. Although the first communications device 24 is generically shown, the first communications device 24, as will be later explained, may be a computer, a personal digital assistant (PDA), a cordless/cellular/IP phone, or other wireline/wireless communications device. The website development application 20 is a program comprising code or instructions for developing a website. The website development application 20 creates and stores a questionnaire 26 in the memory 22. The questionnaire 26 may additionally or alternatively be remotely stored on some remote device communicating via a communications network 32, and the questionnaire 26 may be obtained as needed. The questionnaire 26 comprises one or more questions 28 soliciting information to develop the website.

FIG. 1 also illustrates a second communications device 30. The first communications device 24 communicates with the second communications device 30 via a communications network 32. The first communications device 24 and the second communications device 30 may have a server-client relationship, such that the website development application 20 can send the questionnaire 26 to the second communications device 30. The questionnaire 26 is received at the second communications device 30 and visually or audibly presented to a website client. A browser 34, for example, may cause the questionnaire 26 to be visually presented at a display device 36. The website client, using the second communications device 30, may see/hear the questionnaire 26 and input answers to the questions.

The questionnaire 26 seeks information to help develop a website. The questionnaire 26, for example, may seek names, addresses, phone numbers, email addresses, or any other communications addresses for the website client. The questionnaire 26 may ask for desired colors, layout, structure, or other design elements. The questionnaire 26 may instruct the website client to attach any files describing a logo, trademark, emblem, or other artwork. The questionnaire 26 may comprise multiple-choice questions, yes/no questions, or textual data fields. The questionnaire 26 may comprise audible questions that are digitally produced. The questionnaire 26 and its contents may have any form that solicits information to develop a website.

The website development application 20 receives a response 38. Once the website client finishes responding to the questions 28, the website client submits the response 38. The response 38 comprises answers, textual data, and/or other information that helps develop the website. The response 38 may even include an attachment 40 containing artwork 42 or other information. The response 38 communicates via the communications network 32 from the second communications device 30 to the website development application 20 operating in the first communications device 24. The website development application 20 then locally stores the response 38 in the memory 22. The website development application 20 may additionally or alternatively remotely store the response 38 at a remote storage device 44 communicating via the communications network 32. Because the response 38 is stored for retrieval, a website consultant and/or website developer (neither shown for simplicity) may quickly obtain the website client's information and begin developing the client's website.

The exemplary embodiments may be applied regardless of networking environment. The communications network 32 may be a cable network operating in the radio-frequency domain and/or the Internet Protocol (IP) domain. The communications network 32, however, may also include a distributed computing network, such as the Internet (sometimes alternatively known as the "World Wide Web"), an intranet, a local-area network (LAN), and/or a wide-area network (WAN). The communications network 32 may include coaxial cables, copper wires, fiber optic lines, and/or hybrid-coaxial lines. The communications network 32 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
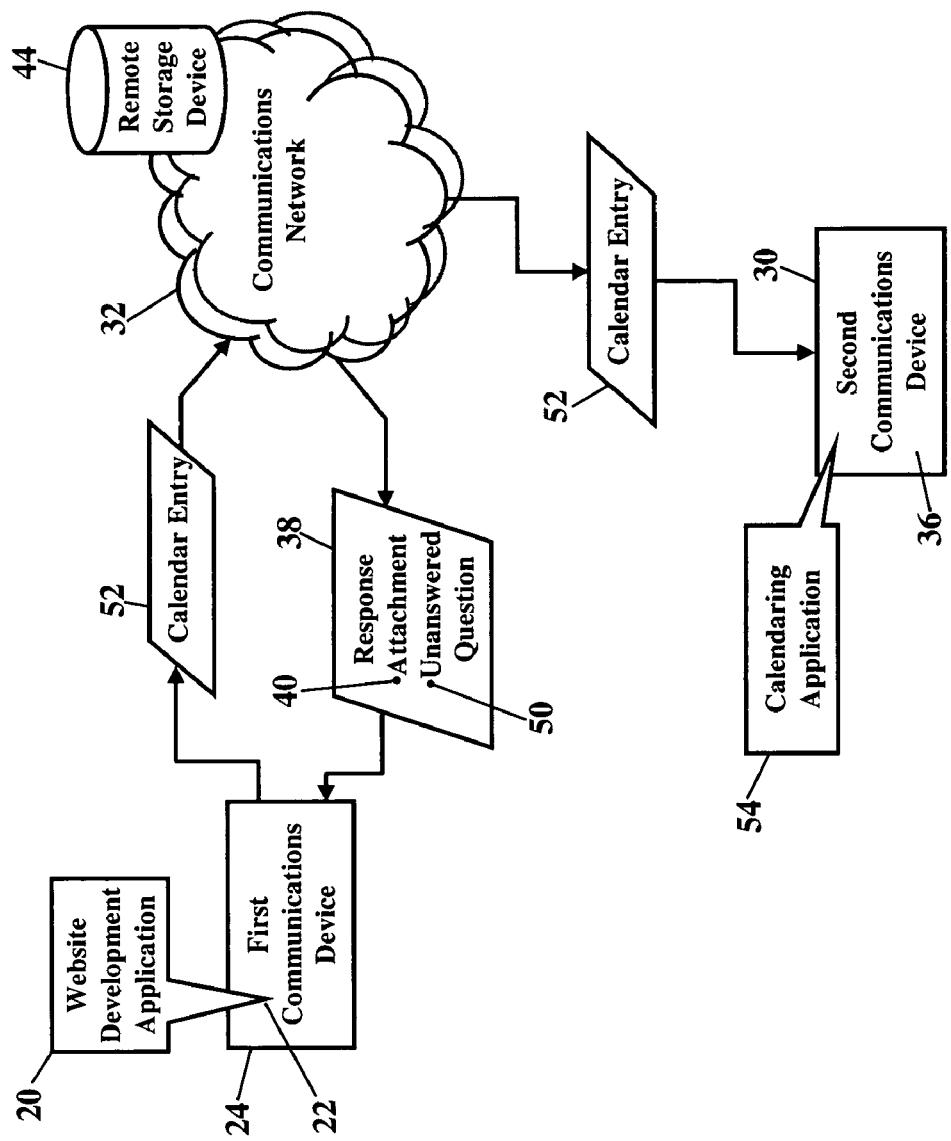
FIG. 2 is a schematic illustrating use of calendar entries, according to more exemplary embodiments.

FIG. 2 is a schematic illustrating use of calendar entries, according to more exemplary embodiments. Here the website development application 20 examines the response 38 for unanswered questions. Recall the response 38 comprises answers to the questions posed by the questionnaire (shown, respectively, as reference numerals 28 and 26 in FIG. 1). When the website development application 20 receives the response 38, the website development application 20 may inspect the response 38 for unanswered questions. Any questions that are unanswered, partially answered, and/or undecipherable are noted by the website development application 20 as errors, conditions, or flags that require resolution. If the attachment 40 is expected, but not found, then the website development application 20 similarly sets a flag requiring resolution.

The website development application 20 then creates calendar entries. For any flag, condition, or error requiring or desiring a resolution, the website development application 20 creates a calendar entry. Each unanswered question 50, for example, causes the website development application 20 to create a corresponding calendar entry 52. That is, when the website client submits the response 38 with the unanswered question 50, that unanswered question 50 may solicit information important or even necessary for developing the client's website. The website development application 20 may select a default answer or response to the unanswered question, even without prompting or contacting the website client. If, however, the website development application 20 is unable to select a default answer, then the website development application 20 produces an automatic reminder. This automatic reminder is the calendar entry 52, and the calendar entry 52 communicates to the website client's calendaring application 54. The website client's calendaring application 54 may be locally stored in the second communications device 32, or the website client's calendaring application 54 may be remotely maintained on some computer or server communicating via the communications network 32. The calendar entry 52 causes the website client's calendaring program to produce an audible and/or visual reminder of the unanswered question 50. The website client is thus automatically reminded of the missing information solicited by the unanswered question 50. Those of ordinary skill in the art appreciate that there are many suitable implementations for the calendaring application 54 described herein. MICROSOFT®, for example, offers OUTLOOK® and OUTLOOK EXPRESS®, both of which provide electronic calendars (MICROSOFT®, OUTLOOK®, and OUTLOOK EXPRESS® are registered trademarks of Microsoft Corporation, One Microsoft Way, Redmond Wash. 98052-6399, 425.882.8080, www.Microsoft.com). Other vendors also offer other calendaring software applications, and the concepts described herein may be applied to any calendaring application by any vendor.

Figure 3:
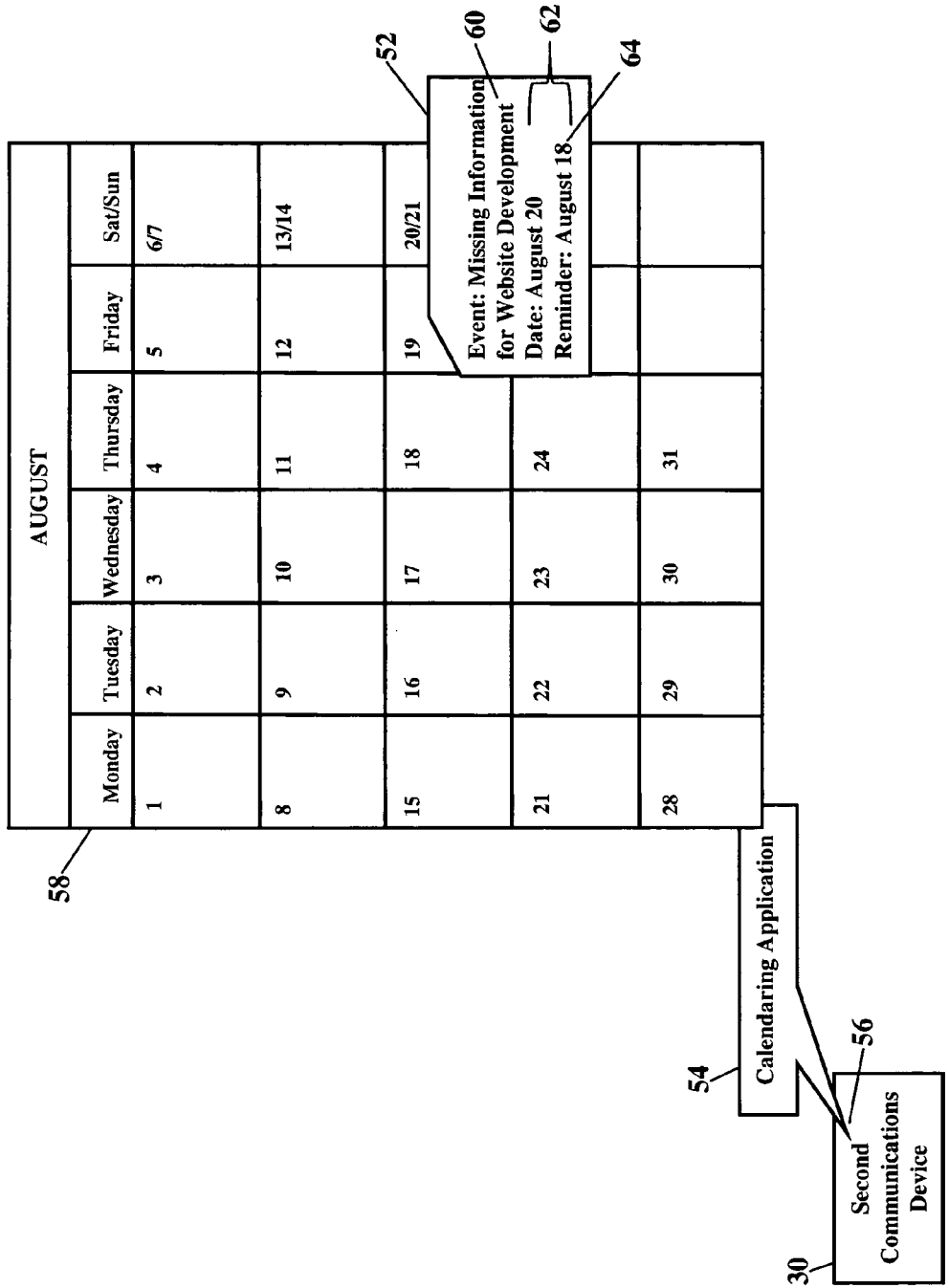
FIG. 3 is a schematic illustrating a calendar entry, according to more exemplary embodiments.

FIG. 3 is a schematic illustrating the calendar entry 52, according to more exemplary embodiments. Here the calendaring application 54 is shown stored in memory 56 of the second communications device 30. The calendaring application 54 stores and produces an electronic calendar 58. The calendar entry 52 corresponds to an event 60 and to a rule 62. As those of ordinary skill in the art recognize, a calendar event usually describes an appointment, a meeting, a holiday, a birthday, some important date, a deadline, or perhaps an anniversary. The rule 62 describes a date and/or time at which the event is to occur. Here, however, the event 60 describes the unanswered question (shown as reference numeral 50 in FIG. 2), and the rule 62 comprises a reminder 64 of the event 60. That is, when the website client submits the response (shown as reference numeral 38 in FIG. 2) with the unanswered question, the website development application 20 will produce the automatic reminder 64. This automatic reminder 64 causes the website client's calendaring application 54 to remind the website client of the missing information. The reminder 64 may include a date and a time at which a notification or an alert is audibly and/or visually presented by the calendaring application 54. The reminder 64 provides notice associated with the stored event 60. The alert, for example, may be an audible sound, alarm, and/or visual notification that reminds a user of the upcoming event 60.

Figure 4:
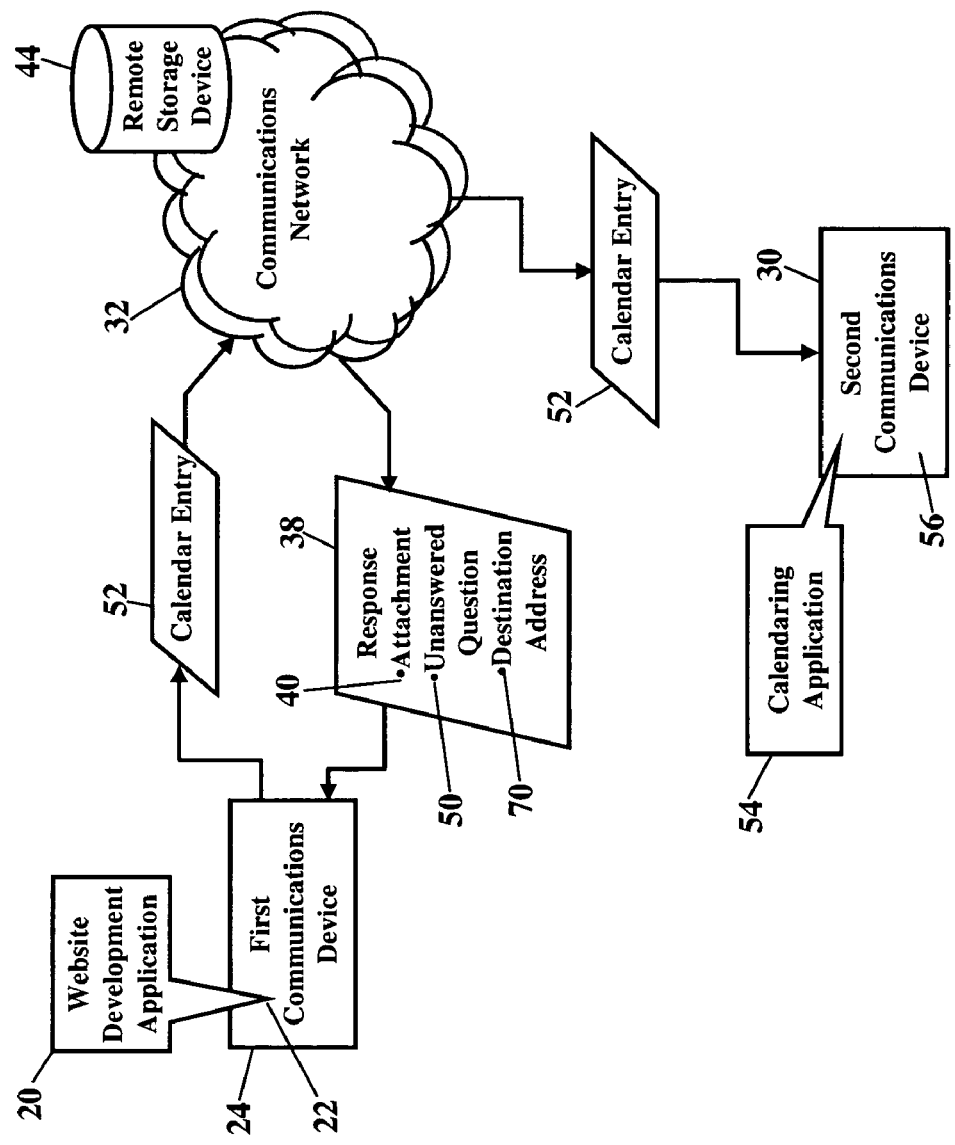
FIG. 4 is a schematic illustrating communication of the calendar entry, according to yet more exemplary embodiments.

FIG. 4 is a schematic illustrating communication of the calendar entry 52, according to yet more exemplary embodiments. The website development application 20 addresses the calendar entry 52 to any destination address representing the website client's calendaring application 54. FIG. 4, for simplicity, shows the calendar entry 52 communicating from the website development application 20 and to the second communications device 30 via the communications network 32. The website client, however, may designate any destination address using the response 38. That is, the website client may specify a desired destination address 70 for the calendar entry 52 in the response 38. As the website development application 20 reviews the response 38, the website development application 20 also retrieves the destination address 70.

Figure 5:
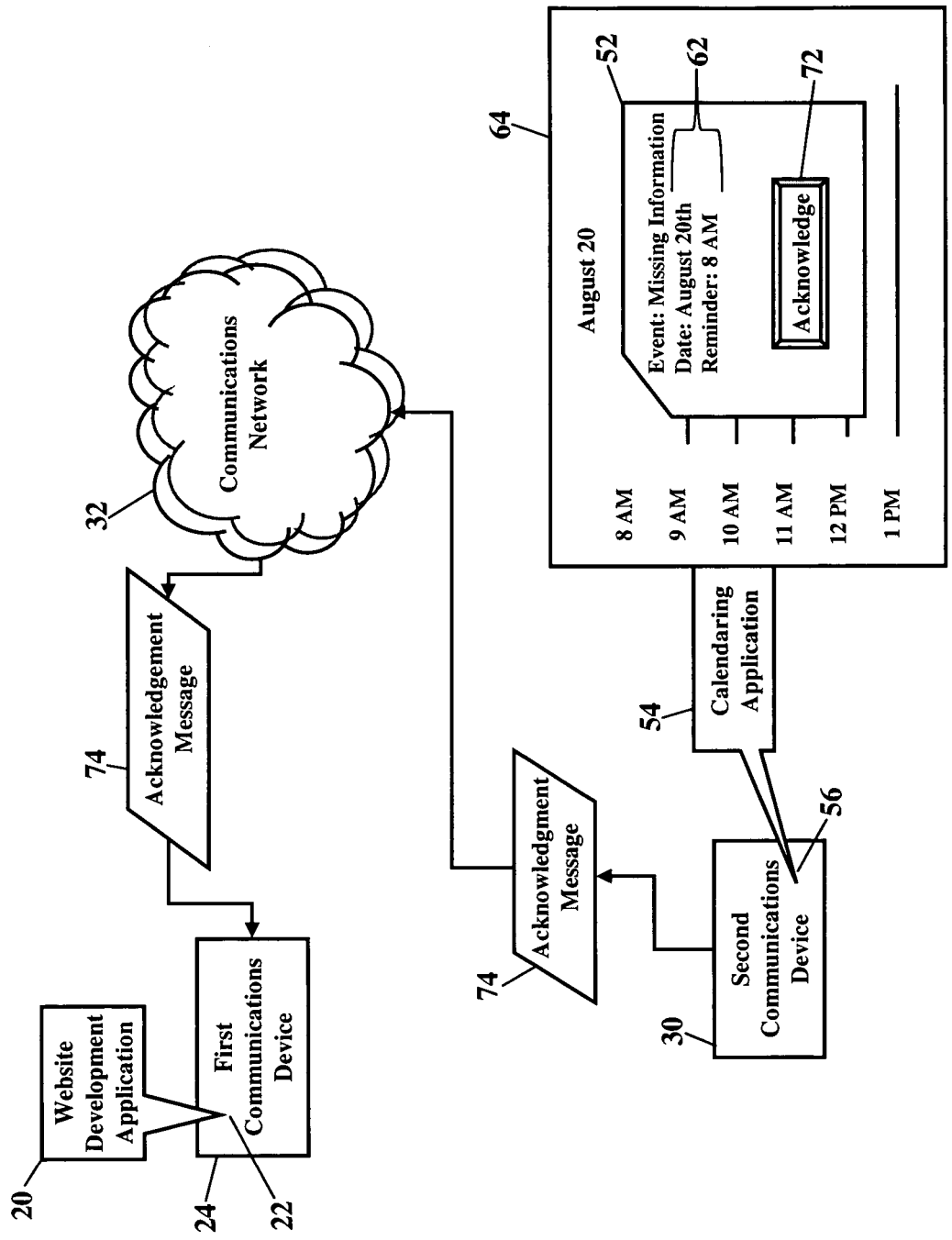
FIG. 5 is a schematic illustrating an acknowledgment of a reminder, according to still more exemplary embodiments.

FIG. 5 is a schematic illustrating an acknowledgment of the reminder 64, according to still more exemplary embodiments. Suppose the rule 62 specifies an event date of August $20^{th}$, and the reminder 64 is to be presented August $18^{th}$. FIG. 5, then, illustrates a visual presentation of the reminder 64 on August $18^{th}$, two days prior to the event date. The reminder 64 includes an opportunity for a user to acknowledge 72 the reminder 64. FIG. 5 shows the acknowledgement 72 as a graphical button that the website client "clicks" with a pointing device or "taps" on a screen. The acknowledgement 72, however, can be any action, input, occurrence, or event that is recognized by the calendaring application 54. The acknowledgement 72 may include any actions that dismisses/cancels the reminder 64, delays the reminder 64, suspends the reminder 64, and/or other actions that will be explained. The acknowledgement 72 informs the calendaring application 54 that the reminder 64 was viewed, heard, smelled, felt, even tasted by the website client. The acknowledgement 72 may be a keystroke on a keyboard, the push of a button on a pointing device, an input to a pressure-sensitive display, or any other input recognized by the calendaring application 54. The calendaring application 54, in fact, may not require an input, but, instead, self-acknowledge using software-defined conditions. However the reminder 64 is acknowledged, that acknowledgement 64 is received by the calendaring application 54.

FIG. 5 also illustrates an acknowledgement message 74. When the user acknowledges the reminder 64, the calendaring application 54 then communicates the acknowledgement message 74 via the communications network 32. The acknowledgement message 74 return communicates to the website development application 20. The acknowledgement message 74 informs the website development application 20 of the website client's reminder acknowledgement. The website development application 20 receives the message 74 and knows the website client acknowledged the reminder 64.

Figure 6:
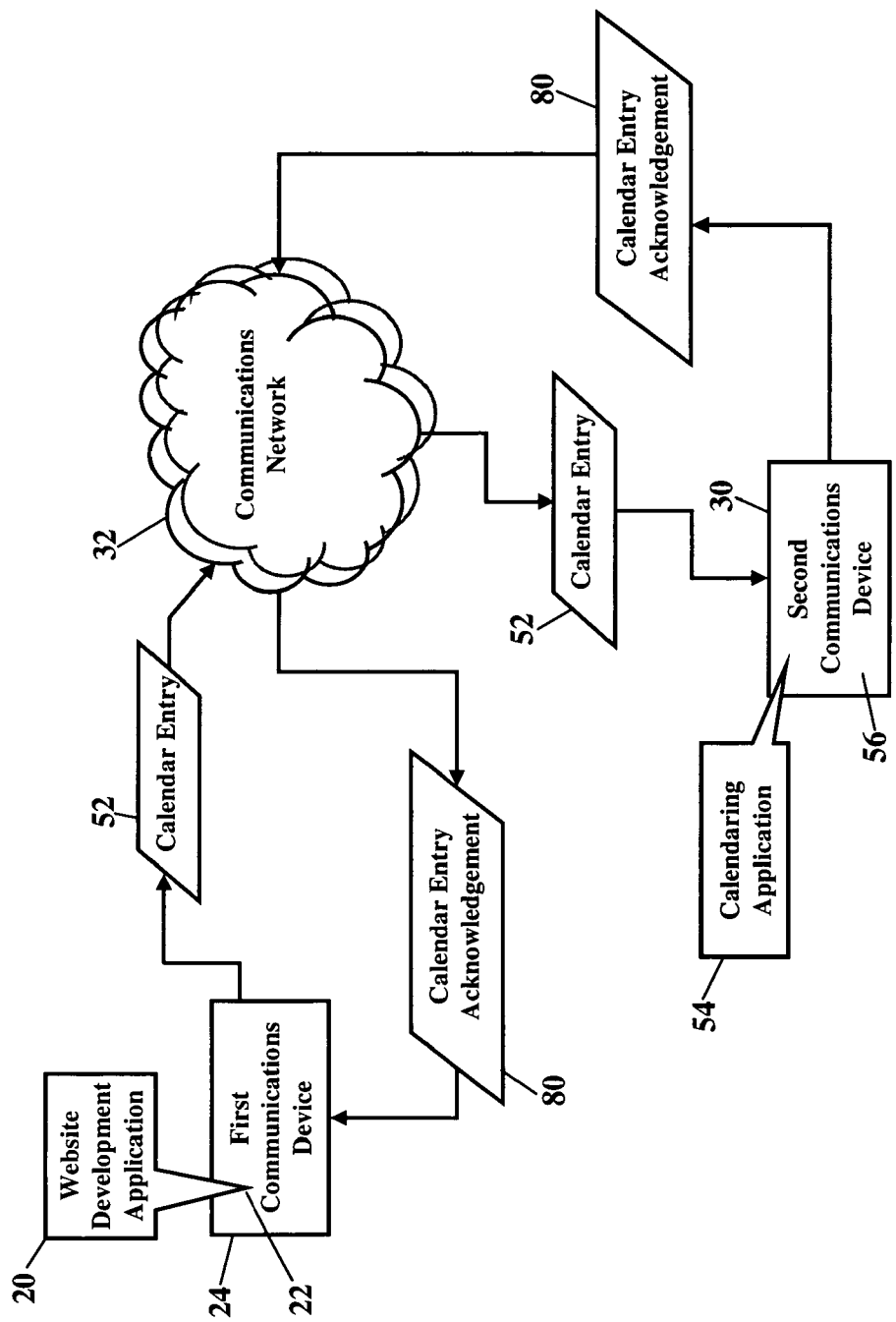
FIG. 6 is a schematic illustrating a calendar entry acknowledgment, according to exemplary embodiments.

FIG. 6 is a schematic illustrating a calendar entry acknowledgment 80, according to exemplary embodiments. The website development application 20, as earlier described, creates a calendar entry for any flag, condition, or error requiring or desiring a resolution. The website development application 20 produces the calendar entry 52 as an automatic reminder for incomplete, missing, or indecipherable information. The calendar entry 52 communicates to the website client's calendaring application 54. When the calendar entry 52 is successfully installed, added, or posted to the website client's electronic calendar, the calendaring application 54 produces the calendar entry acknowledgment 80. The calendaring application 54 then communicates the calendar entry acknowledgment 80 via the communications network 32. The calendar entry acknowledgment 80 return communicates to the website development application 20. The calendar entry acknowledgment 80 informs the website development application 20 that the calendar entry 52 was added to the calendaring application 54.

Figure 7:
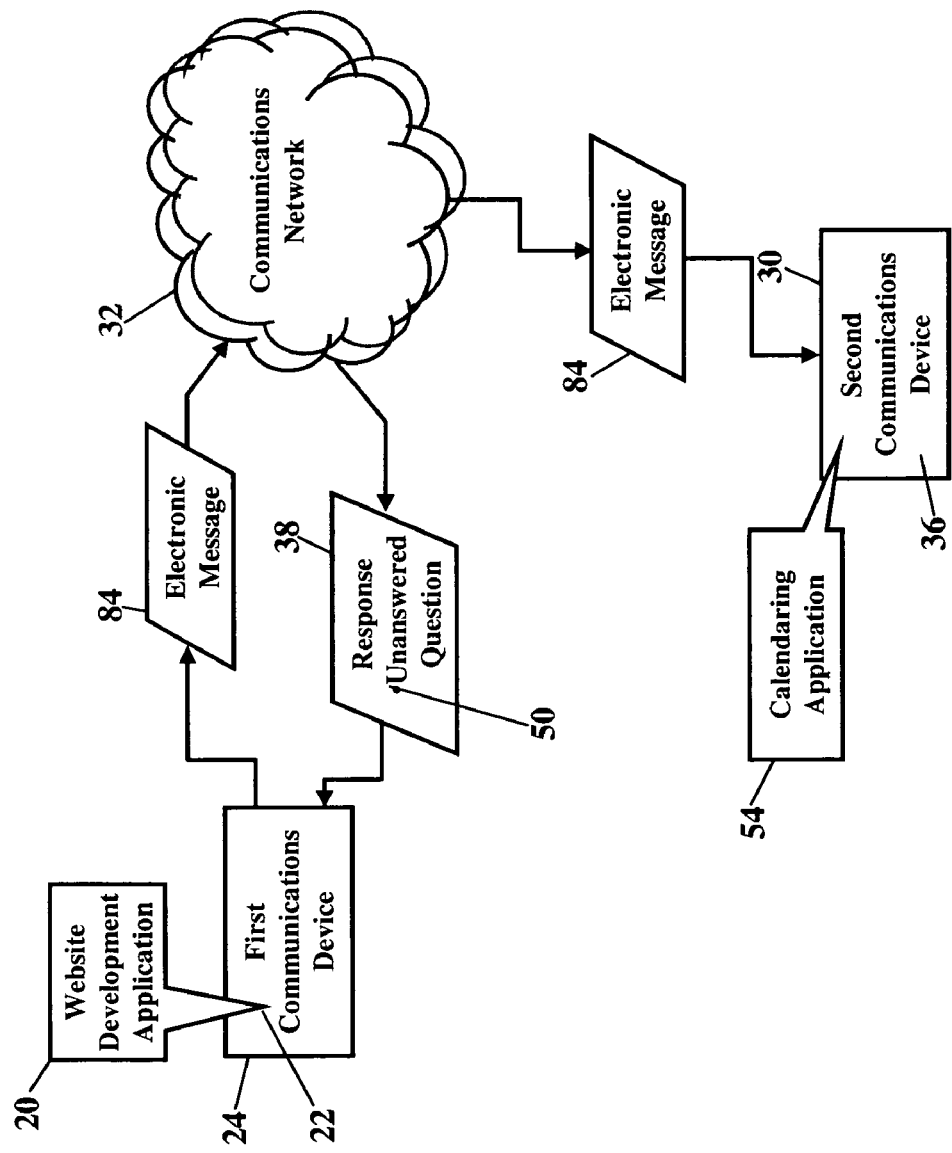
FIG. 7 is a schematic illustrating use of electronic messages, according to more exemplary embodiments.

FIG. 7 is a schematic illustrating use of electronic messages, according to more exemplary embodiments. Here the website development application 20 sends one or more electronic messages 84 when the response 38 has unanswered, incomplete, or indecipherable information. When the website development application 20 receives the response 38, the website development application 20 examines the response 38. The response 38 is examined for unanswered questions, missing information, and/or indecipherable responses. Any questions that are unanswered, partially answered, and/or undecipherable are noted by the website development application 20 as errors, conditions, or flags that require resolution. Here the website development application 20 then produces the electronic message 84. The electronic message 84 contains textual, graphical, video, or audible information that informs the website client of the incomplete response. The electronic message 84 may be any electronic message, such as an email, page, and/or instant message. The electronic message 84 may also be a telephone call or Internet telephony call. The website development application 20 addresses the electronic message 84 to any communications address associated with the website client or chosen by the website client. The communications address may be retrieved from information in the response 38. The electronic message 84 provides a message reminder of any missing, incomplete, or indecipherable information in the response 38. The electronic message 84, for example, may be sent for each unanswered question 50 contained within the response 38. Each electronic message 84 comprises information that describes the corresponding unanswered question 50.

Figure 8:
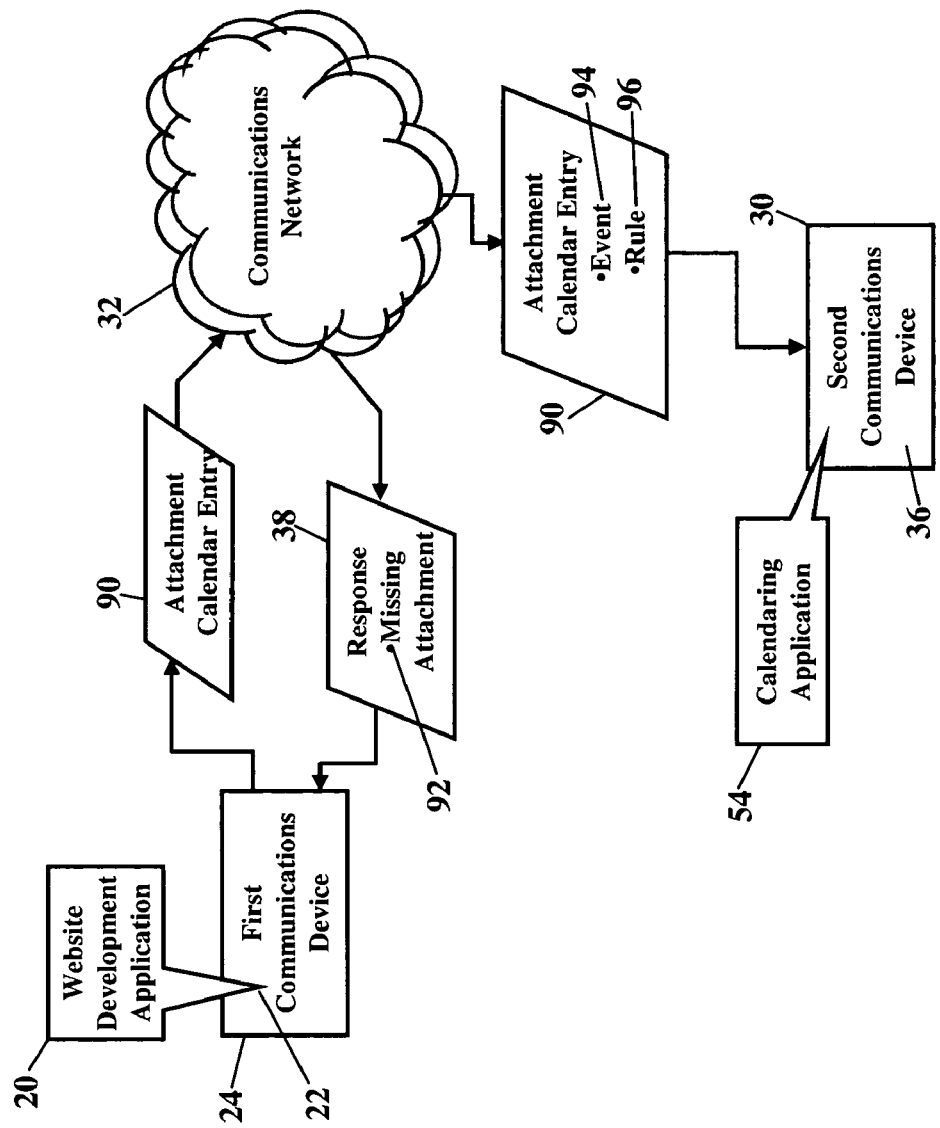
FIG. 8 is a schematic illustrating further uses of calendar entries, according to more exemplary embodiments.

FIG. 8 is a schematic illustrating further uses of calendar entries, according to more exemplary embodiments. Here the website development application 20 creates and sends an attachment calendar entry 90 when the response 38 is missing an attachment. When the website client submits the response 38, the website development application 20 reviews the response 38. If information is provided that indicates an attachment should be present, but the attachment is missing, then the website development application 20 flags this missing attachment 92. The website development application 20 creates the attachment calendar entry 90 for the calendaring application 54. The attachment calendar entry 90 corresponds to the missing attachment 92 in the response 38. The attachment calendar entry 90 has an associated event 94 and rule 96. The event 94 describes the missing attachment 92 and the rule 96 comprises a separate reminder of the event. The website development application 20 addresses the attachment calendar entry 90 to any destination address representing the website client's calendaring application 54. FIG. 8, for simplicity, shows the attachment calendar entry 90 communicating to the second communications device 30 via the communications network 32. The attachment calendar entry 90 causes the calendaring application 54 to produces an automatic reminder of the missing attachment 92.

Figure 9:
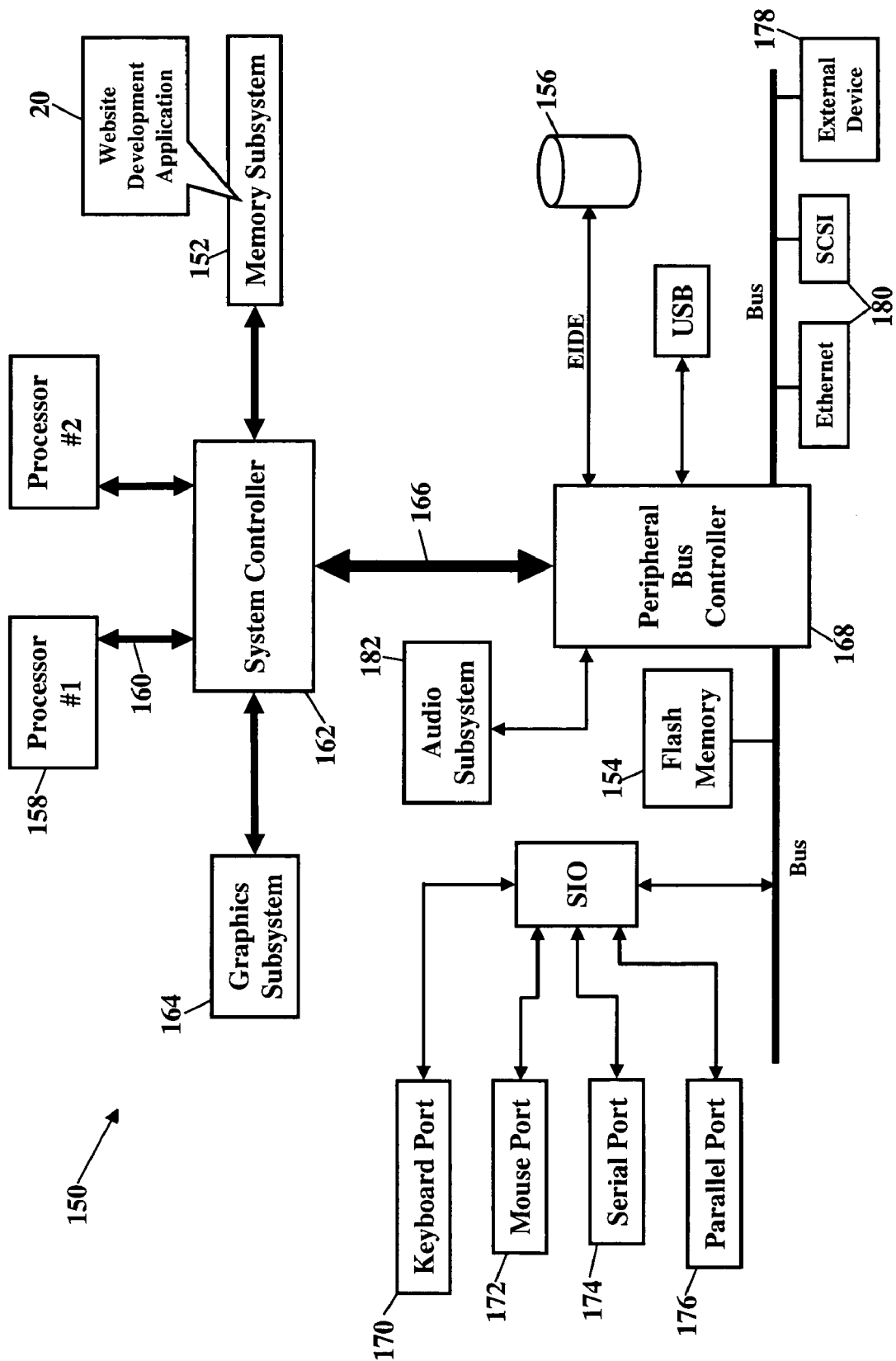
FIG. 9 depicts another possible operating environment for the exemplary embodiments.

FIG. 9 depicts another possible operating environment for the exemplary embodiments. FIG. 9 is a block diagram showing the website development application 20 residing in a processor-controlled system 150 (such as the first communications device 24). FIG. 9, however, may also represent a block diagram of any computer or communications device in which the website development application 20 may operate. The website development application 20 operates within a system memory device. The website development application 20, for example, is shown residing in a memory subsystem 152. The website development application 20, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and networking ports 180 (such as USB, SCSI, or Ethernet). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® operating systems may be used. (WINDOWS® is a registered trademark of Microsoft Corporation, One Microsoft Way, Redmond Wash. 98052-6399, 425.882.8080, www.Microsoft.com.) Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical Subscriber Interface (GUI). The Graphical Subscriber Interface typically includes a combination of signals communicated along the keyboard port 170 and the mouse port 172. The Graphical Subscriber Interface provides a convenient visual and/or audible interface with a subscriber of the computer system 150.

Figure 10:
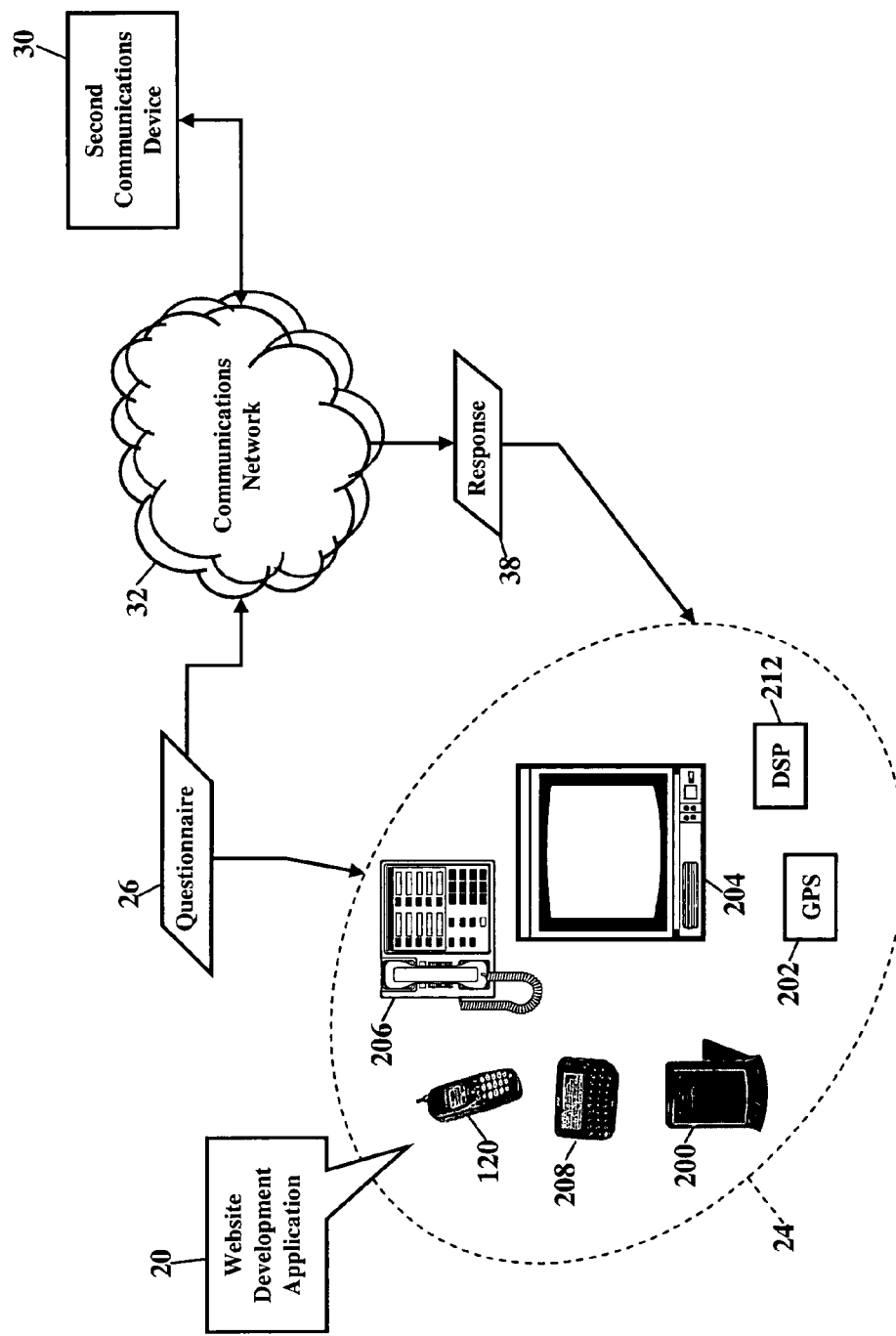
FIG. 10 is a schematic illustrating the website development application operating within various other communications devices.

FIG. 10 is a schematic illustrating still more exemplary embodiments. FIG. 10 illustrates that the website development application 20 may alternatively or additionally operate within various other communications devices. FIG. 10, for example, illustrates that the website development application 20 may entirely or partially operate within a personal digital assistant (PDA) 200, a Global Positioning System (GPS) device 202, an interactive television 204, an Internet Protocol (IP) phone 206, a pager 208, a cellular/satellite phone 210, or any computer system and/or communications device utilizing a digital signal processor (DSP) 212. The first communications device 24 may also include watches, radios, vehicle electronics, clocks, printers, media devices, and other apparatuses and systems.

Figure 11:
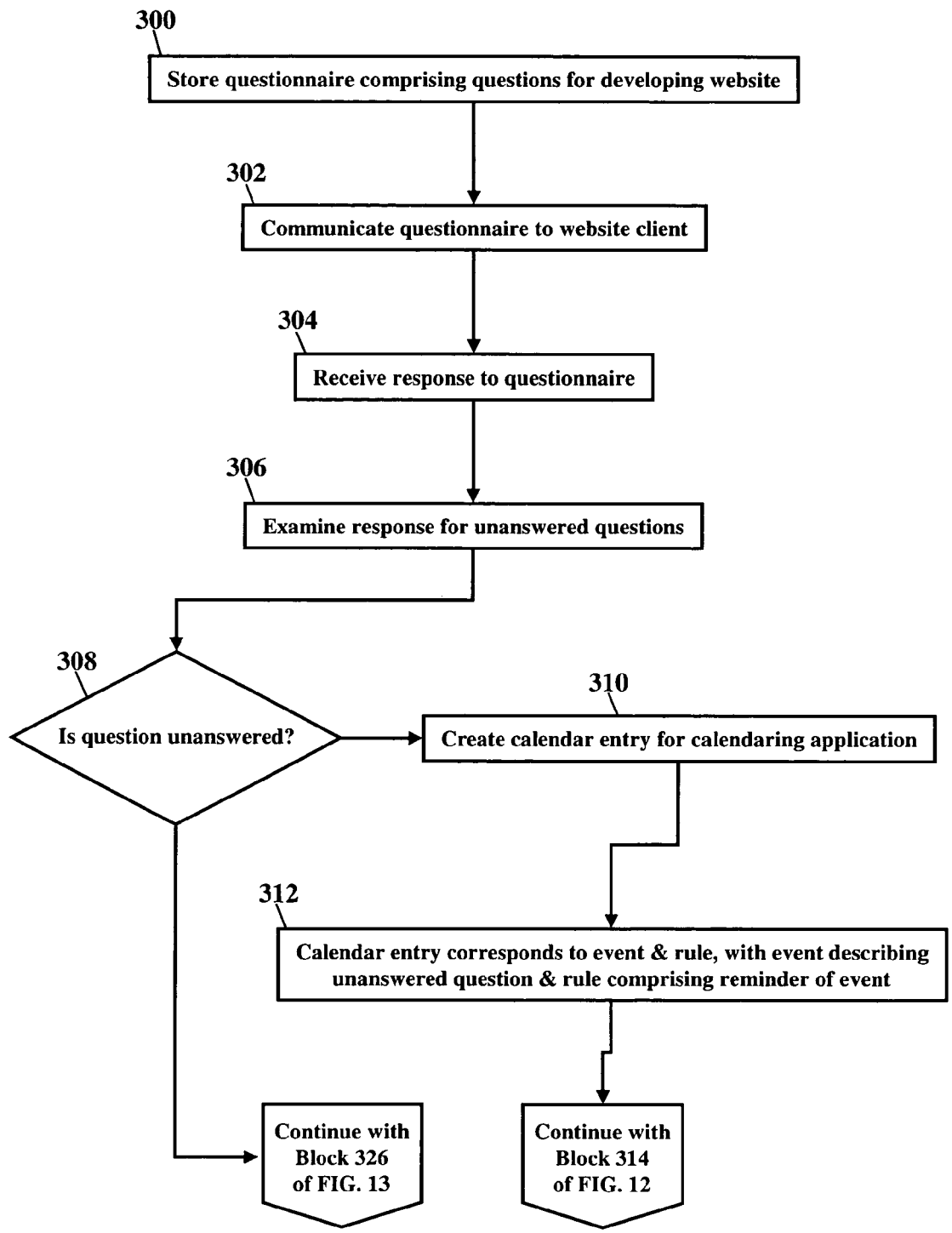
FIGS. 11-13 are flowcharts illustrating a method of developing a website, according to exemplary embodiments.
Figure 12:
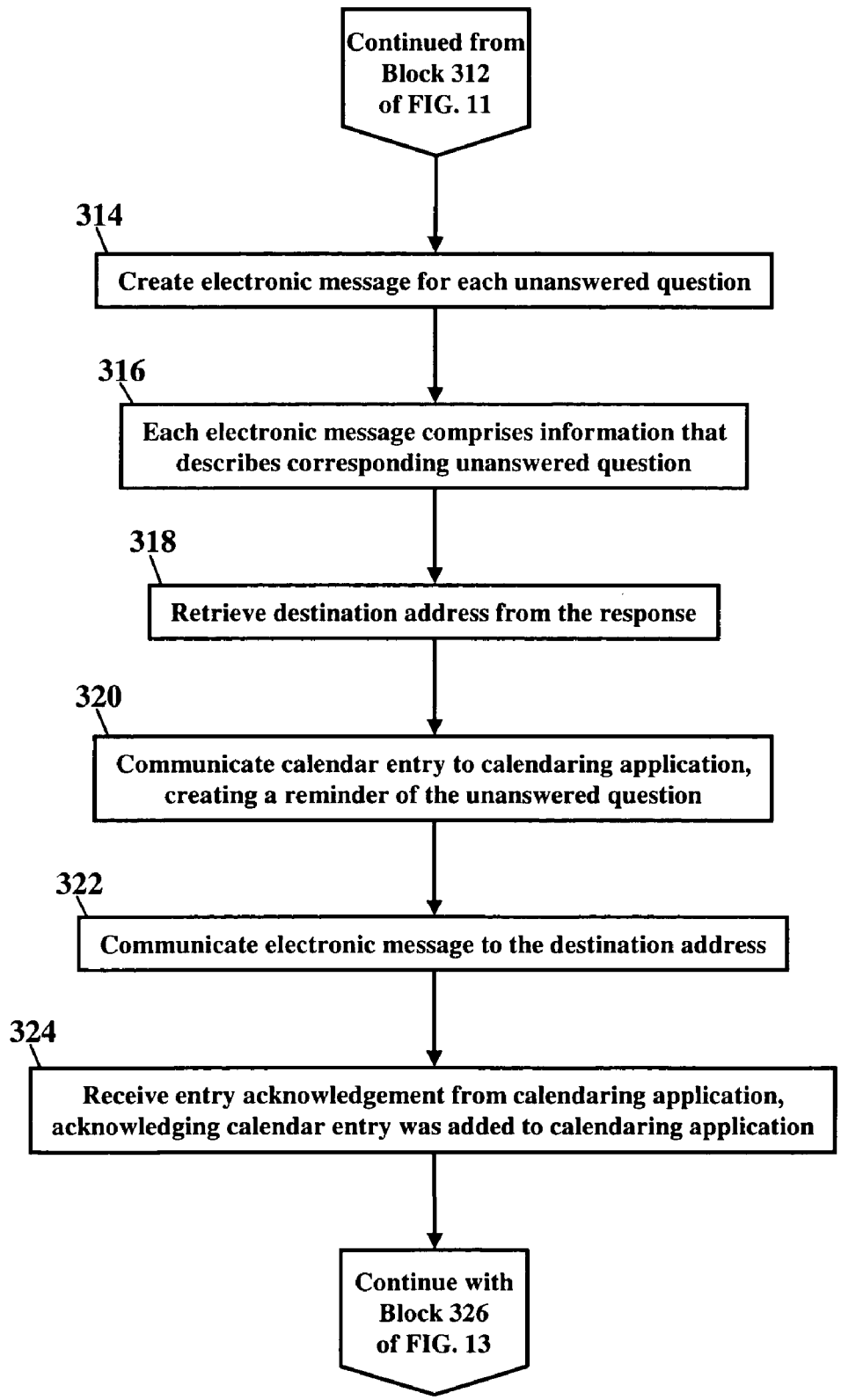
Figure 13:
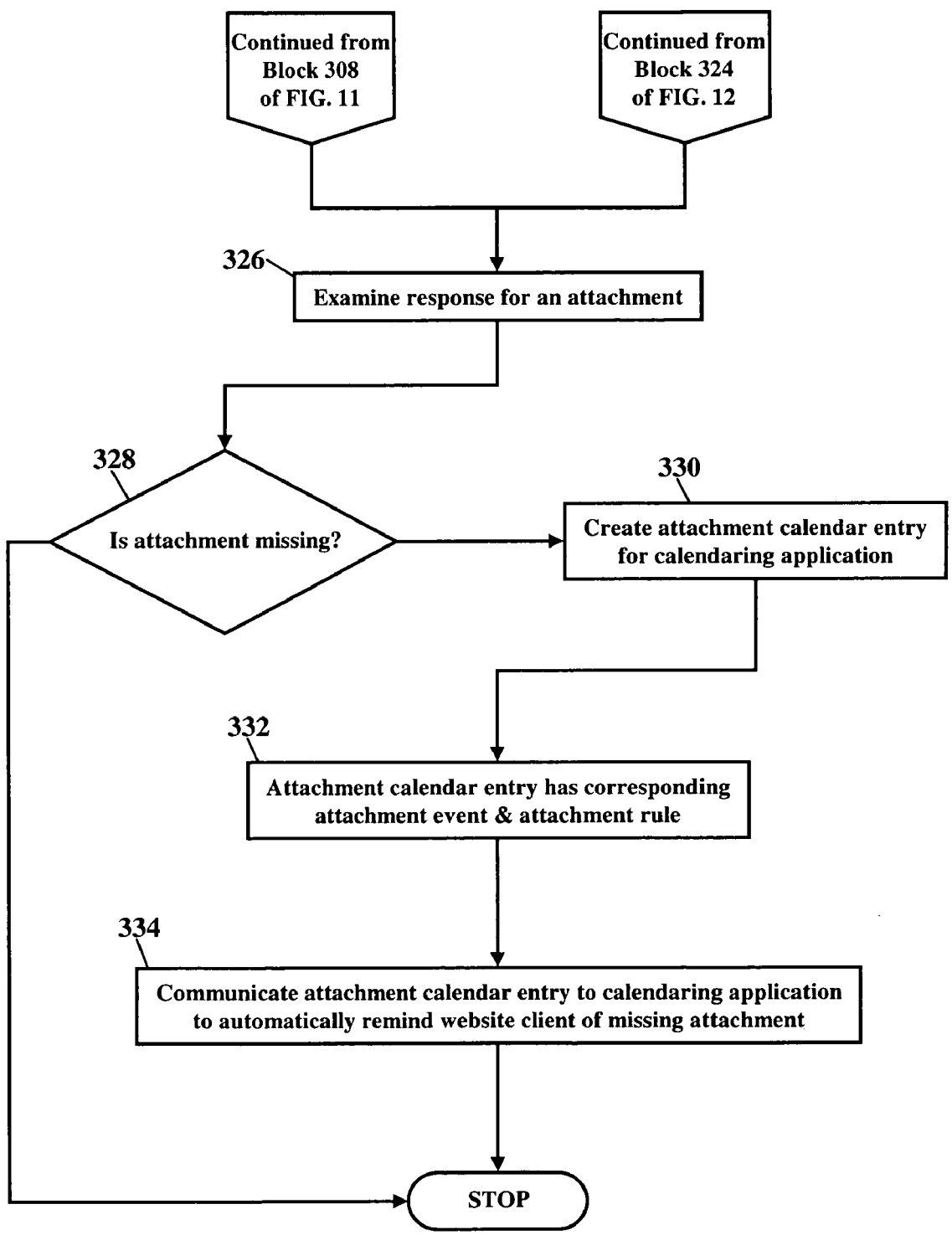

FIGS. 11-13 are flowcharts illustrating a method of generating a website, according to exemplary embodiments. A questionnaire is stored in memory (Block 300), and the questionnaire comprises questions for developing the website. The questionnaire is communicated to a website client (Block 302), and a response to the questionnaire is received (Block 304). The response is examined for unanswered questions (Block 306). If a question is unanswered (Block 308), a calendar entry may be created for a calendaring application (Block 310). The calendar entry corresponding to an event and a rule, with the event describing the unanswered question and the rule comprising a reminder of the event (Block 312).

The flowchart continues with FIG. 12. An electronic message may additionally or alternatively be created for each unanswered question (Block 314). Each electronic message comprises information that describes a corresponding unanswered question (Block 316). A destination address is retrieved from the response (Block 318). The calendar entry is communicated to the calendaring application, and the calendar entry creates a reminder of the unanswered question (Block 320). The electronic message is also communicated to the destination address (Block 322). An entry acknowledgement may be received from the calendaring application (Block 324), with the entry acknowledgement acknowledging that the calendar entry was added to the calendaring application.

The flowchart continues with FIG. 13. The response is also examined for an attachment (Block 326). If the attachment is missing from the response (Block 328), then an attachment calendar entry may be created for the calendaring application (Block 330). The attachment calendar entry corresponds to a missing attachment in the response. The attachment calendar entry has a corresponding attachment event and an attachment rule (Block 332). The attachment event describes the missing attachment and the attachment rule comprises a separate reminder of the attachment event. The attachment calendar entry is communicated to the calendaring application to automatically remind the website client of the missing attachment (Block 334).

The website development application (shown as reference numeral 20 in FIGS. 1-10) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the website development application to be easily disseminated. A computer program product comprises the website development application stored on the computer-readable medium. The website development application comprises computer-readable instructions/code for storing a questionnaire in memory. The questionnaire comprises questions for developing the website. The questionnaire is communicated to a website client. A response to the questionnaire is received and examined for unanswered questions. For each unanswered question, a calendar entry for a calendaring application is created. The calendar entry corresponds to an event and a rule, with the event describing the unanswered question and the rule comprising a reminder of the event. The calendar entry is communicated to the calendaring application operating at the website client, and the calendar entry produces a reminder of the unanswered question.

The website development application may be physically embodied on or in any addressable (e.g., HTTP, I.E.E.E.

802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of developing a website comprising:
storing a website development application in memory;
receiving a request for a questionnaire for developing the website;
retrieving the questionnaire from the memory;
transmitting the questionnaire to a website client, the questionnaire comprising questions for developing the website;
receiving a response to the questionnaire and storing the response in the memory;
examining the response for unanswered questions;
flagging an error in the response;
creating a calendar entry that corresponds to the error, the calendar entry comprising an event and a rule, with the event describing the error and the rule comprising a reminder of the event;
retrieving a destination address from the response that corresponds to the calendaring application;
transmitting the calendar entry to the destination address associated with the calendaring application to produce the reminder of the event in the calendaring application;
examining the response for an attachment;
flagging another error when the attached file is missing from the response;
creating an attachment calendar entry that corresponds to the missing attached file, the attachment calendar entry having an attachment event and an attachment rule, the attachment event describing the missing attachment and the attachment rule comprising a separate reminder of the attachment event; and
sending the attachment calendar entry to the destination address associated with the calendaring application to produce an automatic reminder of the missing attachment.

2. A method according to claim 1, further comprising receiving an acknowledgement of the reminder from the calendaring application.

3. A method according to claim 1, further comprising sending an electronic message for at least one unanswered question, the electronic message comprising information that describes a corresponding unanswered question.

4. A method according to claim 1, further comprising receiving an acknowledgement from the calendaring application, the acknowledgement acknowledging that the calendar entry was added to the calendaring application.

5. A method according to claim 1, further comprising sending a message to the destination address that alerts the website client of the error in the response.

6. A system comprising:
a processor executing code stored in memory that causes the processor to:
store a website development application in memory;
receive a request for a questionnaire for developing the website;

retrieve the questionnaire from the memory;
transmit the questionnaire to a website client, the questionnaire comprising questions for developing the website;
receive a response to the questionnaire and storing the response in the memory; examine the response for unanswered questions;
flag an error in the response;
create a calendar entry that corresponds to the error, the calendar entry comprising an event and a rule, with the event describing the error and the rule comprising a reminder of the event;
retrieve a destination address from the response that corresponds to the calendaring application;
transmit the calendar entry to the destination address associated with the calendaring application to produce the reminder of the event in the calendaring application;
examine the response for an attachment;
flag another error when the attached file is missing from the response; create an attachment calendar entry that corresponds to the missing attached file, the attachment calendar entry having an attachment event and an attachment rule, the attachment event describing the missing attachment and the attachment rule comprising a separate reminder of the attachment event; and
send the attachment calendar entry to the destination address associated with the calendaring application to produce an automatic reminder of the missing attachment.

7. A system according to claim 6, wherein the code further causes the processor to receive an acknowledgement of the reminder from the calendaring application.

8. A system according to claim 6, wherein the code further causes the processor to send an electronic message for each unanswered question via the interface, each electronic message comprising information that describes a corresponding unanswered question.

9. A system according to claim 6, wherein the code further causes the processor to receive an acknowledgement from the calendaring application via the interface, the acknowledgement acknowledging that the calendar entry was added to the calendaring application.

10. A system according to claim 6, wherein the code further causes the processor to send a message to the destination address that alerts the website client of the error in the response.

11. A computer program product comprising a computer readable medium storing processor executable instructions for performing a method, the method comprising:
storing a website development application in memory;
receiving a request for a questionnaire for developing the website;
retrieving the questionnaire from the memory;
transmitting the questionnaire to a website client, the questionnaire comprising questions for developing the website;
receiving a response to the questionnaire and storing the response in the memory;
examining the response for unanswered questions;
flagging an error in the response;
creating a calendar entry that corresponds to the error, the calendar entry comprising an event and a rule, with the event describing the error and the rule comprising a reminder of the event;
retrieving a destination address from the response that corresponds to the calendaring application;

transmitting the calendar entry to the destination address associated with the calendaring application to produce the reminder of the event in the calendaring application;

examining the response for an attachment;

flagging another error when the attached file is missing from the response;

creating an attachment calendar entry that corresponds to the missing attached file, the attachment calendar entry having an attachment event and an attachment rule, the attachment event describing the missing attachment and the attachment rule comprising a separate reminder of the attachment event; and sending the attachment calendar entry to the destination address associated with the calendaring application to produce an automatic reminder of the missing attachment.

12. A computer program product according to claim 11, further comprising computer code for receiving an acknowledgement of the reminder.

13. A computer program product according to claim 11, further comprising computer code for sending an electronic message for at least one unanswered question, the electronic message comprising information that describes a corresponding unanswered question.

14. A computer program product according to claim 11, further comprising computer code for receiving an acknowledgement from the calendaring application, the acknowledgement acknowledging that the calendar entry was added to the calendaring application.

15. A computer program product according to claim 11, further comprising computer code for examining the response for an attachment.

* * * * *